United States Patent Office 3,554,698
Patented Jan. 12, 1971

3,554,698
HYDROLYSIS OF ORGANIC SILICATES TO PRODUCE POLYMERS AND RESINS
Alfred J. Burzynski, Toledo, and Judith A. Walmsley, Sylvania, Ohio, assignors to Owens-Illinois, Inc., a corporation of Ohio
No Drawing. Filed Feb. 1, 1966, Ser. No. 523,898
Int. Cl. C01b 33/00; C08f 11/04; C07d 103/02
U.S. Cl. 23—182        13 Claims

ABSTRACT OF THE DISCLOSURE

Polymeric organosiloxanes which are clear and may be either flexible or rigid, hard, solid materials containing only silicon-oxygen linkages are formed by hydrolysis of alkyl or aryl orthosilicates in the presence of water, a mineral acid, and a solvent to form a single phase system. The mixture is refluxed until the reaction is essentially complete and then at least a portion of the solvent is removed while avoiding gelation of the resulting prepolymer. Subsequently, the prepolymer can be cast and cured to produce the solid clear polymeric product.

---

The present invention relates to a method for forming new flexible and rigid solid silicate resins, and more particularly to such solid resins as are formed from ethyl orthosilicate hydrolysis and condensation.

The hydrolysis and condensation of silicates and silane derivatives to yield organosilicon polymers has had, prior to the present invention, many limitations as to reaction products obtained, due primarily to the difficulties encountered in controlling the reaction. Hydrolysis and subsequent condensation frequently yielded gels, which have little or no commercial value, or when a solid was obtained it was hard and brittle and consequently also of little value. To eliminate these difficulties the reactants were changed so that the resultant polymer had silicon-carbon bonds in addition to the silicon-oxygen linkages. Polymeric compounds having only silicon-oxygen linkages were limited to viscous liquids and fluids.

Accordingly, it is an object of this invention to provide new flexible and rigid solid silicate resins while avoiding the disadvantages inherent in the known methods and compositions as set forth.

Another object of this invention is the formation of new solid silicate resins.

It is a further object of this invention to provide a method for the controlled hydrolysis and condensation of silicates to yield new solid silicate resins.

It is a further object of the present invention to yield usuable solid silicon resins having only silicon-oxygen linkages.

Still another object of the present invention is the formation of solid silicon containing resins which may be either flexible or hard and rigid and which are commercially useful.

In attaining the above objects, one feature of the present invention resides in the hydrolysis and condensation of alkyl orthosilicates to yield usable silicon polymers.

Another feature of the present invention resides in the hydrolysis and condensation reaction being carried out in a single phase system.

Other objects and features will become apparent from the following detailed description of the present invention.

It has been discovered that silicates, as will be described hereinafter in greater detail, can be hydrolyzed and subsequently condensed in a single phase system to yield commerically usable silicon containing resins having only silicon-oxygen linkages.

The new solid polymeric compounds of the present invention are superior in several significant properties as compared to the prior art silicon polymers having only silicon-oxygen linkages. The polymers of this invention are clear hard resins free from cracks and strains, and may be flexible or rigid. In addition, these polymers do not yellow on heating and are capable of transmitting visible and ultraviolet light down to 210 mu.

In carring out the present invention the silicate, water, a solvent and an acid are mixed together forming a single phase system which is heated to reflux temperature and maintained at this temperature until the reaction is essentially complete. The solvent, which is miscible with both the water and silicate, may then be removed and the residue heated or precured to a temperature of about 100–220° C. This elevated temperature, which is maintained for a short period of time, up to 30 minutes, is below the gel point temperature of the silicate. After precuring, the residue while still at the precure temperature, may be cast into various forms and cured at 25°–135° C. for a time period sufficient to obtain the desired hardness in the solid resin. As will be more fully discussed, the degree of flexibility or rigidity of the solid is dependent mainly on the water-silicate molar ratio. Curing time may vary from hours to weeks depending upon the curing temperature and hardness desired.

Hydrolysis of silicates or silane derivatives is considered to be a stepwise equilibrium process:

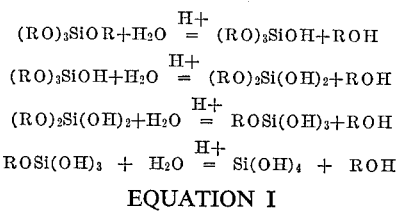

EQUATION I wherein R is an alkyl or aryl group having from 1 to 8 carbons. The resultant silanols are very reactive, losing water on heating to form polymers.

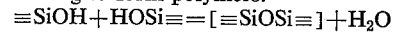

EQUATION II

The condensation reaction as performed heretofore, usually does not stop at the linear polymeric stage but instead continues within the chain resulting in a highly branched polymer whose properties were of little commercial value. The rapidity of the hydrolysis and condensation reaction prevented stopping the reaction when only one or two alkoxy groups were hydrolyzed and as a result the reaction proceeded to the gel stage yielding a product of little commercial value.

As explained previously, in order to obviate this disadvantage and control the reaction, silanes having one or more non-hydrolyzable groups were used by prior workers. This obviously limited the degree of cross-linking.

Condensation initially occurs during the reflux stage of the reaction to form a prepolymer with water as the by-product. Use of a solvent aids in controlling the reaction, preventing too rapid a hydrolysis and resulting gel formation.

Concentration of the solution by removal of 60–90% of the combined solvent and alcohol by-product leads to a further reactive silanol compound. Removal of all solvent and alcohol by-product may cause gelation with a result that formation of hard resins are no longer possible.

Precuring removes the remaining volatile materials and increases the viscosity of the residue.

After casting, the resin is cured at 25°–135° C. during which time condensation polymerization continues, eliminating the water by-product. This polymerization gives rise to linear and branch condensations resulting in a hard resin which is clear or only slightly yellow—and free from strain.

Detailed experimentation has shown that the flexibility or rigidness of the reaction product is dependent upon the molar ratio of water to silicate. Good results have been obtained when the water to silicate molar ratio is 1/1 to 3/1, with the preferred range being 1.5/1 to 2.25/1. Flexible products were obtained at the lower limits and rigid resins at the upper limits. Loss of flexibility has been observed as the water to silicate molar ratio increases.

In the lower limit of the water to silicate molar ratio (1.5/1 or less) there is initially insufficient water present to hydrolyze two alkoxy groups from the silicate molecule. The remaining water needed for the hydrolysis is obtained from the condensation step and therefore water is gradually added to the reaction medium as needed. Very little opportunity is provided for cross-linking in the initial stages resulting in a longer linear chain and therefore a flexible product as opposed to a rigid product. Cross-linking, which is required to increase the hardness of the product, occurs mainly during the precuring and curing stages.

When the initial water concentration is such that the water silicate molar ratio is 2/1 or higher, there is sufficient water present for hydrolysis of two alkoxy groups. The additional water formed by the condensation reaction leads to hydrolysis of the remaining alkoxy groups and cross-linking of the resin chains. Since this additional water is gradually added, the reaction proceeds at a relatively slow rate and is controllable.

Formation of an orderly silicon structure from the hydrolysis and condensation reaction is also due to the presence of the alcohol solvent. The solvent causes the equilibrium in the hydrolysis reactions, Equation I, to be shifted to the left slowing down the rate of hydrolysis of the silanes with a resulting decrease in rate of condensation. The rate of hydrolysis and condensation being reduced permits the formation of a more orderly polymeric structure.

If the alcohol used as the solvent medium in the reaction is higher than the alcohol moiety of the ester group of the silane, a partial exchange occurs between the solvent and silane. The higher alkoxy groups on the silane are hydrolyzed at a slower rate than the original alkoxy groups, thereby slowing the rate of hydrolysis and consequently the rate of condensation.

Included among the silicates that can be employed for purposes of this invention are those represented by the structural formula:

(I) 

in which R is an alkyl or aryl group having from 1 to 8 carbons; and (II) 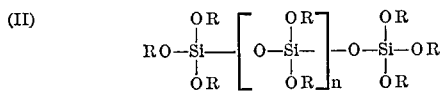

in which R is as described above and $n$ is an integer from 0 to 10. It is to be understood that the R groups may be the same or different in the above formula.

The structure given for the polymeric compound II is a representative structure only and the compounds used may have both linear and branched groups.

Representative, but non-limiting examples, of compounds included within structural Formulas I and II are:

ethyl orthosilicate
n-propyl orthosilicate
ethyl polysilicate
isopropyl orthosilicate
n-butyl orthosilicate
phenyl orthosilicate Solvents used in the present invention posses the following characteristics:

(1) must be miscible with both water and silicate in order that a single phase system is formed;
(2) must be inert to dilute acid, water and silicates;
(3) must be a solvent for lower molecular weight polysilicon compounds, so that the compounds do not separate from the solution limiting the chain length;
(4) must have a relatively low boiling point (high vapor pressure) to so that the reaction temperature will be such to permit the reaction to proceed at a reasonable rate and so that the solvent can be easily removed.

Included among the suitable solvents, are methanol, ethanol, n-propanol, iso-propanol, butanol, higher alcohols, other polar organic solvents, and mixtures thereof. The preferred solvents are alkyl alcohols having 1 to 6 carbon atoms. When 95% ethanol is used as the solvent the quantity of water included with the ethanol must be included in the calculation of water required for the reaction.

Mineral acids, such as hydrochloric acid, were found to be the most effective catalyst. The acid concentration utilized varied from 2.7 parts per million (p.p.m.) to 320 p.p.m. In the absence of acid, the reaction proceeds at too slow a rate to be of practical value.

Reflux time varied from 30 minutes to 16 hours with a preferred time of 4 hours. At the end of 4 hours refluxing, the hydrolysis was essentially complete and condensation had progressed to a satisfactory point so that the further condensation occurring during the concentration of the solution, precuring and curing states remained controllable.

The following examples illustrate the present invention but should not be considered as limiting the invention in any way.

EXAMPLE 1

In a flask equipped with a reflux condenser was placed 111 ml. (0.5 mole) distilled ethyl orthosilicate, 80 ml. methanol, 9 ml. (0.5 mole) distilled water and 3 drops of 0.1 N HCl (2.7 p.p.m.). The water to ethyl orthosilicate molar ratio was 1/1. The resultant single phase system was heated to reflux temperature and the solution refluxed for four (4) hours. At the end of this time, 130 ml. of alcohol was distilled and the residue transferred to a beaker where it was heated to 140 to 180° C. to effect precure. The fluid residue was then cast into disks in an aluminum mold and cured in an oven at 90° C. to yield a clear flexible solid resin.

EXAMPLE 2

Using apparatus and procedure similar to Example 1, a solution was prepared from 111 ml. (0.5 mole) ethyl silicate, 100 ml. n-propanol, 15 ml. (0.89 mole) distilled water (includes 1 ml. from the acid) and 20 drops of 1 N HCl. The molar ratio of water to ethyl orthosilicate was equal to 1.8/1. The resultant solution was refluxed for four (4) hours after which 160 ml. of alcohol was distilled. The residue was transferred to a beaker where it was heated to 140 to 175° to effect precure and then cast into disks as previously. The disks were cured in an oven maintained at 90° C. A moderately hard, clear solid resin was obtained from this procedure.

EXAMPLE 3

The procedure for Example 2 was repeated, using 18 ml. (1 mole) distilled water, the water to ethyl orthosilicate molar ratio being 2/1, and 10 drops of 1 N HCl (42 p.p.m.). On distillation, after the reflux period, 155 ml. of alcohol was collected. The residue was precured at 140–160° C. and cast into disks which were cured in an oven at 90° C. The final product was a hard, rigid, clear solid resin.

EXAMPLE 4

In a flask equipped with a reflux condenser was placed 62.7 g. (0.083 mole) ethyl polysilicate, which is represented by the following asumed structure

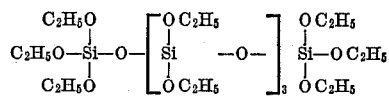

9 ml. (0.5 mole) distilled water, 100 ml. n-butanol and 5 drops 1 N hydrochloric acid (54 p.p.m.). The molar ratio of water to ethyl polysilicate was equal to 6/1, the ratio when calculated as water to ethoxyl groups is 1/2. The resultant solution was refluxed for 4 hours, followed by distillation of the alcohol which yielded 105 ml. of alcohol. The residue was transferred to a beaker and heated (precured) at 140°–160° C. and cast into disks at this temperature. Disks were placed in an oven maintained at 90° C. for several hours, followed by curing at room temperature for 16 hours. They were then reheated to 90° C. and maintained at this temperature until curing was complete, yielding a hard, clear, elastic solid resin.

EXAMPLE 5

In a procedure and apparatus similar to that in Example 1, 111 ml. (0.5 mole) ethyl orthosilicate, 100 ml. n-propanol and 18 ml. (1 mole) distilled water were mixed refluxed for 4 hours. No hydrochloric acid was added to this solution. After refluxing, the alcohol was distilled off collecting 120 ml. Residue boiled at 167° C. which is the boiling point of ethyl orthosilicate indicating that little hydrolysis occurred in the absence of acid.

EXAMPLE 6

In a flask fitted with a reflux condenser were placed 72.5 ml. (0.25 mole) propyl orthosilicate 80 ml. n-propanol, 8 ml. distilled water (0.45 mole) and 2 drops 1 N hydrochloric acid (17 p.p.m.) and the solution refluxed for 4 hours. After the reflux period the alcohol was distilled yielding 110 ml. and the residue precured at 140° C. and a film cast and cured.

EXAMPLE 7

In a procedure similar to Example 1, 111 ml. (0.5 mole) ethyl orthosilicate, 84 ml. 95% ethanol, 12 ml. distilled water and 5 drops 1 N hydrochloric acid were refluxed, the alcohol distilled (collected 141 ml.), the residue precured at 140° C. and cast into disks. A hard, very clear solid resin was obtained after curing at 90° C.

The foregoing examples illustrate that single phase hydrolysis and condensation in the presence of acid will yield clear solid resins ranging from flexible resins to hard, rigid resins depending upon the molar ratio of water to silicate which may vary from 1/1 to 3/1 and in one case where ethyl polysilicate was the reactant, the ratio was 6/1. As the molar ratio approaches the lower limit (1/1) a flexible resin is obtained. The resin increases in hardness as the water to silicate molar ratio increases to its upper limit of 3/1 yielding a hard, clear rigid resin.

In the reaction medium, alcohol is used to form the single phase system.

While we have described and illustrated a preferred embodiment of our invention, we wish it understood that we do not intend to be restricted solely thereto, but that we do intend to cover all modifications thereof which would be apparent to one skilled in the art and which come within the spirit and scope of our invention.

We claim:

1. A method for forming a solid silicate resin which comprises:
   (I) casting a further curable silicate resin, said resin being prepared by
      (a) heating a mixture of a silicate compound represented by the structural formula

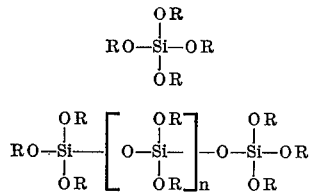

wherein R is an aryl or alkyl group containing 1 to 8 carbon atoms and $n$ is an integer from 0 to 10, water and a mineral acid in the presence of a sufficient solvent to form a single phase system, said heating being done under reflux conditions for a sufficient time to form a partial condensation product and an alcohol by-product, (b) concentrating the partial condensation product of step (a) by removing a portion of the solvent and alcohol by-product, the amount removed being insufficient to gel said partial condensation product,
      (c) precuring the concentrated partial condensation product of step (b) by heating below the gel point temperature, thereby producing said further curable silicate resin, and
   (II) finally curing said resin to a solid at a temperature from 25° to 135° C.

2. The product of claim 1.

3. The process of claim 1 wherein said silicate compound is an orthosilicate compound of the formula

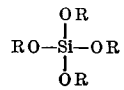

wherein R is an alkyl or aryl group containing from 1 to 8 carbon atoms.

4. The method as defined in claim 3 wherein the mineral acid is present in a concentration of 2.7 to 320 parts per million.

5. The method as defined in claim 3 wherein R is ethyl.

6. The method of claim 3 wherein the water to orthosilicate molar ratio is in the range of 1:1 to 3:1.

7. The method as defined in claim 3 wherein the solvent is an alkyl alcohol having 1 to 6 carbon atoms.

8. The method as defined in claim 3 wherein the water to orthosilicate molar ratio is up to about 1.5:1.

9. The method as defined in claim 3 wherein the water to orthosilicate molar ratio is about 2:1 to 3:1.

10. A method of preparing a precured organosiloxane adapted to be further cured to a hard solid resin having only silicon-oxygen linkages, said method comprising the steps of:
   (A) hydrolyzing a single phase mixture of
      (1) a hydrolyzable alkyl or aryl orthosilicate represented by the structural formula

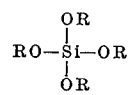

in which R is an aryl group or alkyl group containing 1 to 8 carbon atoms,
      (2) water, wherein the molar ratio of water to orthosilicate ranges from 1:1 to 3:1,
      (3) from 2.7 to 320 parts per million of a mineral acid, and
      (4) a sufficient quantity of a solvent which is an alkyl alcohol containing from 1 to 6 carbon atoms,
   (B) heating the hydrolyzed mixture of step A at the reflux temperature for at least 30 minutes to form a partial condensation product and an alcohol byproduct, (C) concentrating the partial condensation product by heating until 60 to 90% of the solvent and alcohol byproduct is removed by volatilization, (D) precuring the concentrated partial condensation product of step C by heating at a temperature of at least about 100° C. and below the gel point temperature thereof, thereby forming an organopolysiloxane which when heated in the temperature range of about 25° C. to 135° C. produces said hard solid resin.

11. The method as definde in claim 10 wherein the mineral acid is hydrochloric acid.

12. The method as defined in claim 10 wherein the water to orthosilicate molar ratio is about 1.5:1.

13. The method as defined in claim 10 wherein the orthosilicate is ethyl orthosilicate.

References Cited

UNITED STATES PATENTS

| 2,027,932 | 1/1936 | Ray | 23—182 |
| 2,799,693 | 7/1957 | Dodgson | 260—46.5 |

OSCAR R. VERTIZ, Primary Examiner

H. S. MILLER, Assistant Examiner

U.S. Cl. X.R.

260—46.5, 448.2

PO-1050
(5/69)

UNITED STATES PATENT OFFICE
CERTIFICATE OF CORRECTION

Patent No. 3,554,698          Dated January 12, 1971

Inventor(s) Alfred J. Burzynski and Judith A. Walmsley

It is certified that error appears in the above-identified patent and that said Letters Patent are hereby corrected as shown below:

Column 6, claim 1, under (a), the formula should be --

$$\begin{array}{c} \text{OR} \\ | \\ \text{RO-Si-OR} \\ | \\ \text{OR} \end{array}$$

or $$\begin{array}{c} \text{OR} \\ | \\ \text{RO-Si-} \\ | \\ \text{OR} \end{array} \left[ \begin{array}{c} \text{OR} \\ | \\ \text{O-Si-} \\ | \\ \text{OR} \end{array} \right]_n \begin{array}{c} \text{OR} \\ | \\ \text{O-Si-OR} \\ | \\ \text{OR} \end{array}$$

Signed and sealed this 25th day of May 1971.

(SEAL)
Attest:

EDWARD M. FLETCHER, JR.
Attesting Officer

WILLIAM E. SCHUYLER, JR.
Commissioner of Patents